United States Patent [19]

Kunikawa et al.

[11] Patent Number: 4,693,595
[45] Date of Patent: Sep. 15, 1987

[54] METHOD OF CONTROLLING A STOP POSITION OF AN OPTICAL SYSTEM IN A COPYING MACHINE

[75] Inventors: Norihide Kunikawa, Yao; Tetsuya Kondo, Shizuoka; Yasumasa Ohba, Numazu; Michihiro Matsuoka, Susono, all of Japan

[73] Assignee: Sharp Kabushiki, Osaka, Japan

[21] Appl. No.: 770,585

[22] Filed: Aug. 29, 1985

[30] Foreign Application Priority Data

| Aug. 30, 1984 | [JP] | Japan | 59-183179 |
| Aug. 30, 1984 | [JP] | Japan | 59-183180 |
| Aug. 30, 1984 | [JP] | Japan | 59-183181 |
| Aug. 30, 1984 | [JP] | Japan | 59-183182 |
| Sep. 5, 1984 | [JP] | Japan | 59-186209 |

[51] Int. Cl.$^4$ ............................................. G03B 27/32
[52] U.S. Cl. ............................................. 355/77; 355/8; 355/51
[58] Field of Search ............ 355/51, 8, 11, 14 R, 355/3 R, 77

[56] References Cited

U.S. PATENT DOCUMENTS 4,568,171  2/1986  Ikenoue .................................. 355/8

Primary Examiner—Richard A. Wintercorn

[57] ABSTRACT

A copying machine having an optical system movable by a motor in a feed direction with a predetermined feed speed and in a return direction for returning the optical system to a predetermined home position. The optical system is returned with a first speed higher than the feed speed. A countercurrent braking of the motor is performed to decelerate the motor near its home position and the speed of the motor after this braking process is decelerated to such a speed that the optical system can be stopped correctly at the home position.

6 Claims, 14 Drawing Figures

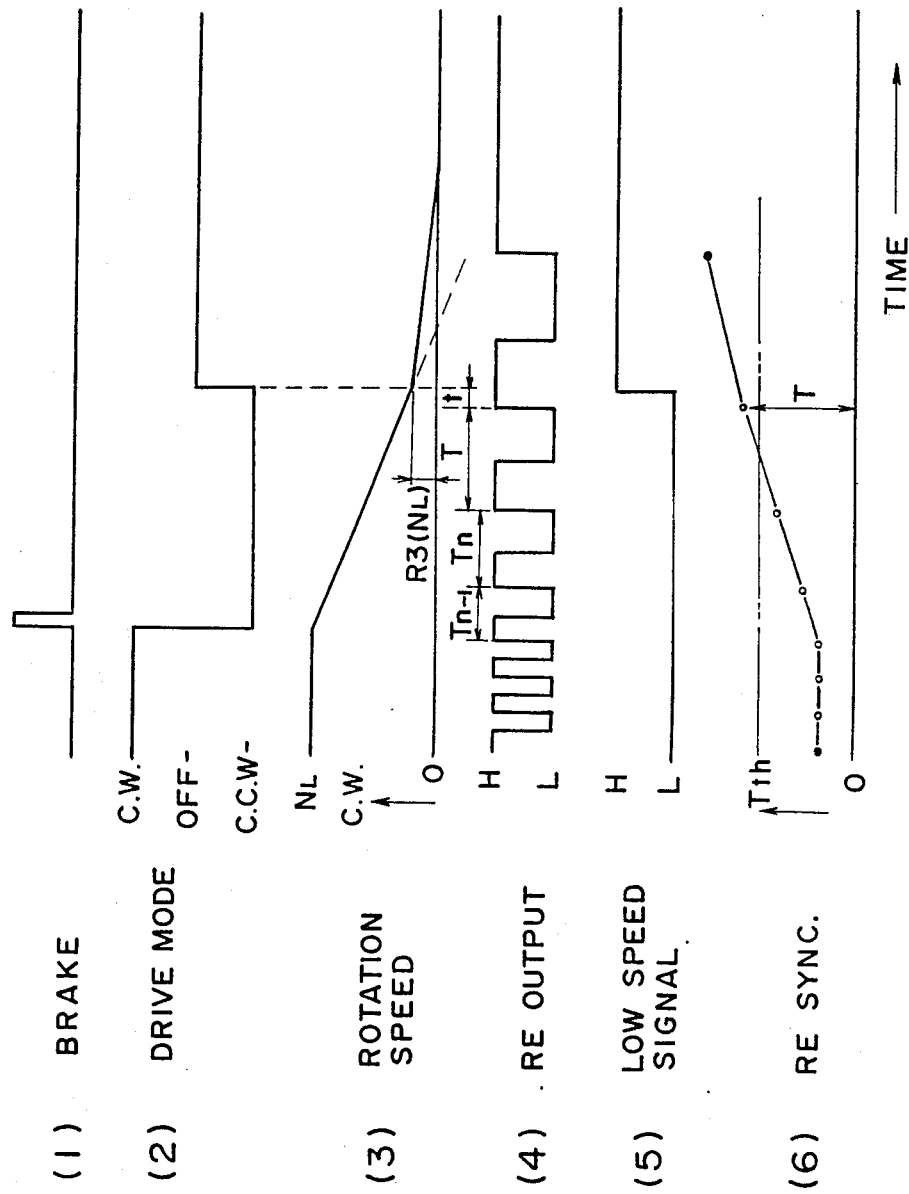

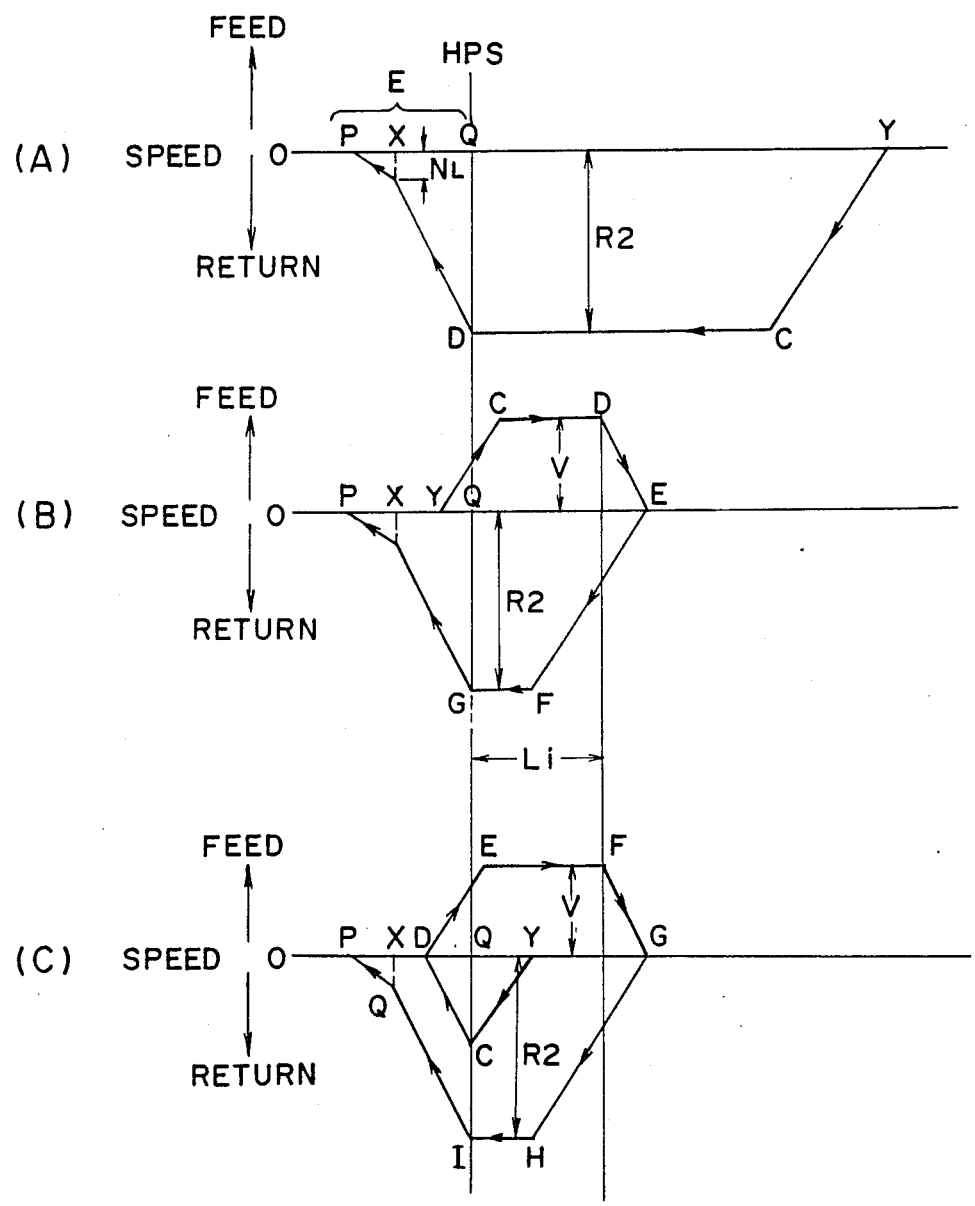

METHOD OF CONTROLLING A STOP POSITION OF AN OPTICAL SYSTEM IN A COPYING MACHINE

FIELD OF THE INVENTION

The present invention relates to a copying machine and more particularly to a method of controlling a stop position of an optical system of a copying machine in an initial state.

BACKGROUND OF THE INVENTION

In a copying machine having a movable optical system for scanning an original to be copied, the original is exposed during feeding of the optical system and the optical system is returned to its home position with a relatively rapid speed. A home position sensor is provided at the home position for stopping the optical system when the home position sensor senses that the optical system is returned to the home position.

However, there can be an error of about ten millimeters or so between the correct home position and the actual stop position of the optical system in conventional copying machine partly because the length of the wire for driving the optical system has been gradually changed and partly because of changes in the sliding friction of a base unit for supporting a lens assembly of the optical system. The change of the stop position of the optical system causes the running speed of the optical system to be unstable even if the optical system comes near a leading position of the picture to be copied when the optical system is started. In order to stabilize the running speed of the optical system at the leading position of the picture in the worst case, there must be a long approach running of the optical system. This long approach prevents decreasing the size of the copying machine.

In addition, stopping the optical system in a correct position requires a first sensor for detecting when the optical system comes near the home position and a second sensor for detecting the correct home position. The signal of these two sensors correctly positions the optical system at its home position.

However, this arrangement requires two sensors. Furthermore, after passing the first sensor, the optical system is moved only the inertia of the fast returning motion and a sufficient braking cannot be obtained. Therefore, the distance between the first sensor and the home position is relatively long. Thus, the distance which does not contribute to the image scanning must be long. Also, as the return speed is not decelerated in the return process, the higher the returning speed, the greater the possibility of error in correctly positioning the system at the stop position.

Furthermore, in attempting to stop the optical system at the correct home position by using a mechanical clutch and/or brake, a strong mechanical shock occurs when the optical system is stopped. In addition, maintenance work for the clutch and brake is required which increases the maintenance cost.

SUMMARY OF THE INVENTION

An essential object of the present invention is to provide a control method for positioning the optical system of a copying machine in a correct start position so as to cause the optical system to advance in the feed direction with a stabilized running speed in the leading portion of the image region even if the approach to the image region is relatively short.

Another object of the present invention is to provide a method of controlling the optical system of the copying machine to stop the optical system in a desired home position correctly even if the returning speed is high.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
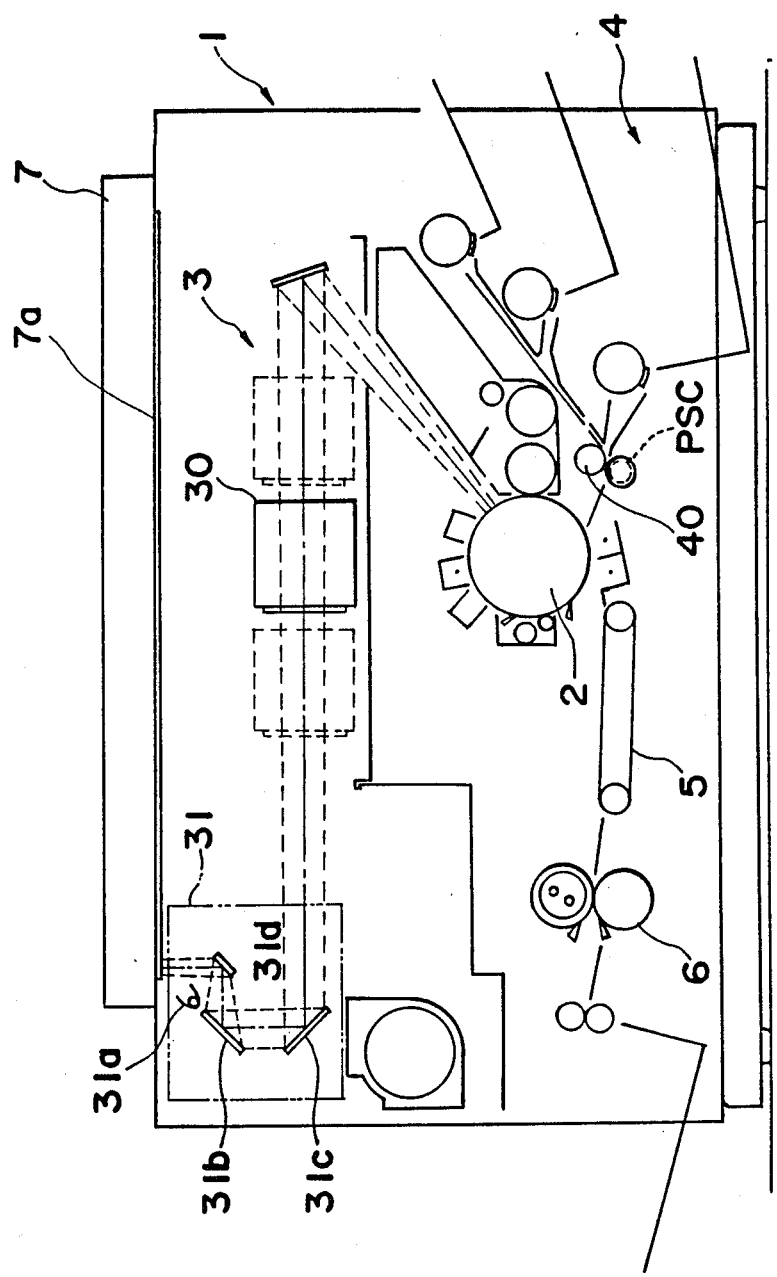
FIG. 1 is a schematic side view of an embodiment of a copying machine according to the present invention.

Referring to FIG. 1, a copying machine 1 comprises a generally centrally located photoreceptor drum 2. Surrounding the photoreceptor drum 2, are a corona charger, a developing unit, a transfer unit, and a charge eraser which are all conventional. An optical system 3 containing a zoom lens 30 is provided above the photoreceptor drum 1 so as to move in a horizontal direction corresponding to a set magnification value. A paper feeding unit 4 containing paper trays and cassette mounting units is disposed on the right side of 2 as seen in FIG. 1. On the left side of the photoreceptor drum 2. There are disposed in the left portion to the photoreceptor drum 2 as seen in FIG. 1, a paper transport unit 5 for transporting a paper which is already copied (referred to as a copied paper hereinafter) and fixing unit 6 comprising a pair of fixing rollers are disposed. An original cover 7 is provided on the top of the copying machine 1 for opening and closing an original platform 7a. By putting an original on the platform 7a with the cover 7 closed, a picture image of the original can be projected to the photoreceptor 3 when the optical system 3 scans the original in the feed direction and an electrostatic charge image corresponding to the picture of the original can be formed on the photoreceptor drum 3 in a known manner. Paper transporting rollers 40 are driven by a paper start clutch PSC so that the operation timing by the clutch PSC aligns the leading edge of the copy paper with the leading edge of the picture image on the photoreceptor drum 2. The on and off timing of the paper start clutch PSC is controlled by a slave CPU (central processing unit) for controlling the optical system as mentioned later.

Figure 2:
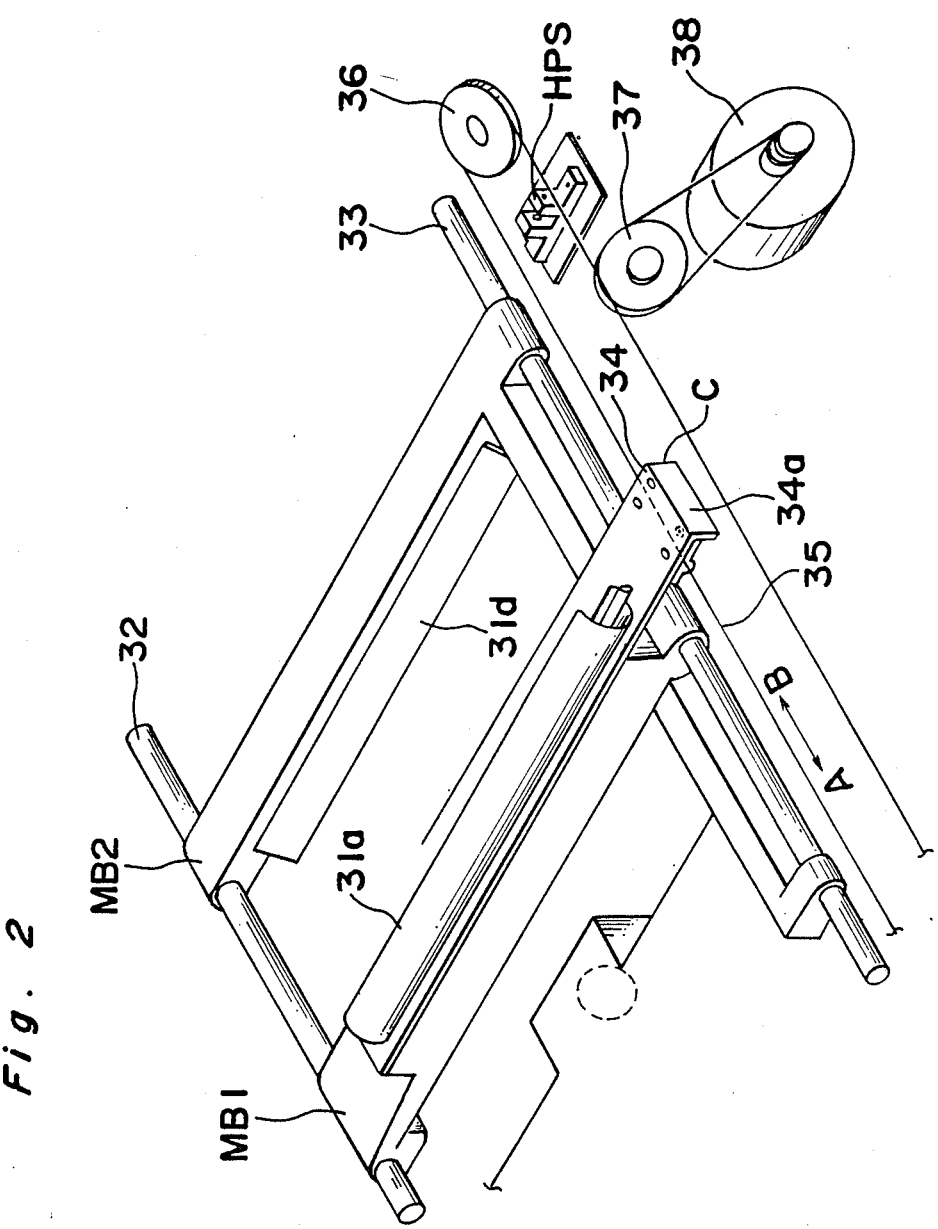
FIG. 2 is a perspective view showing an essential portion of a mechanism for driving an optical system of the copying machine shown in FIG. 1.

Referring to FIGS. 1 and 2 an essential portion of the optical system 3 of the copying machine is shown wherein a scanning unit 31 comprises a light source 31a, a first mirror base MB1 containing two mirrors 31b and 31c and a second mirror base MB2 supporting a mirror 31d for reflecting the light image of the original to the mirror 31b. The mirror bases MB1 and MB2 are respectively slidably supported on a pair of rails 32 and 33 for movement in a horizontal direction. The mirror base MB1 has an elongated shape and has its one end 34 fixedly connected to a driving wire 35 so that both of the mirror bases MB1 and MB2 can be moved in both feeding direction A and returning direction B by the movement of the driving wire 35. The driving wire 35 is suspended along pulleys 36 and 37 and is operatively connected to the driving shaft of a DC motor 38. The driving wire 35 is moved in both directions A and B by rotation of the DC motor 38 in forward or reverse directions, whereby the mirror bases MB1 and MB2 can be moved in both directions A and B.

The end 34 of the mrror base MB1 connected to the driving wire 35 is provided with a vertical plate 34a. A home position sensor HPS of an optical sensor is fixedly disposed near the home position for detecting the presence or absence of the vertical plate 34a so as to detect whether the mirror base MB1 is at the home position. The stop region of the mirror base MB1 is between the position when the mirror base MB1 is returned to the home position and the position when the mirror base MB1 is stopped. Thus, the stop region is between a position when the rear end C of the vertical plate 34a of the mirror base MB1 interrupts the light path of the home position sensor HPS and a second position away from the first position by about ten mm in the direction B (return direction). Thus, as the mirror base MB1 and the optical system 3 move in direction B, they are stopped at a position ten mm from where the rear end C of the vertical plate 34a passes the home position sensor HPS.

In the preferred embodiment, the control device of the copying machine is provided with a master CPU and a slave CPU. The slave CPU receives the signal of the home position sensor HPS, the signal of a rotary encoder RE (not shown) which is coupled with the DC motor 38 and other signals of other sensors (not shown), so as to control the rotation speed of the DC motor 38 and the paper start clutch PSC. The rotary encoder RE detects the amount of rotation of the DC motor 38.

Figure 3:
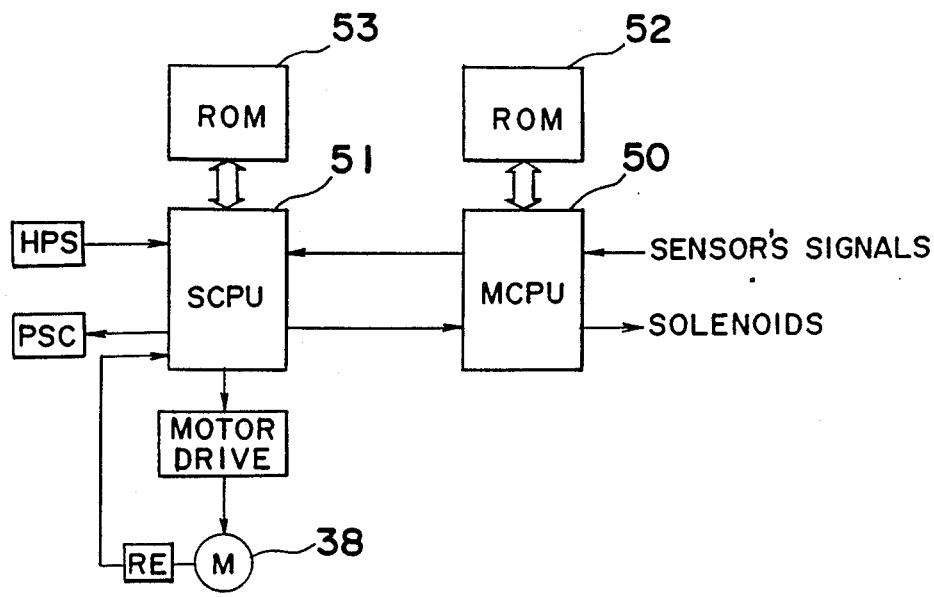
FIG. 3 is a block diagram of a circuit arrangement of a control device used in the copying machine according to the present invention.

Referring to FIG. 3, the master CPU 50 feeds a mirror start command and mirror initialize command to the slave CPU 51 and the slave CPU 51 feeds various status signals to the master CPU 50. The master CPU 50 also receives information from the input keys and the various sensor and acts to feed various commands to the slave CPU 51. The master CPU 50 also receives status signals from the slave CPU 51 and control the various solenoids and the main motor according to the program stored in a ROM 52. The slave CPU 51 receives the signals of the home position sensor HPS and rotary encoder RE. Under the control of the program stored in the ROM 53 and upon receipt of the command of the master CPU 50, the on and off status of the paper start clutch PSC and the rotation speed of motor 38 is controlled. When a predetermined operation is finished, the slave CPU 51 feeds the status signal to the master CPU 50.

Figure 5:
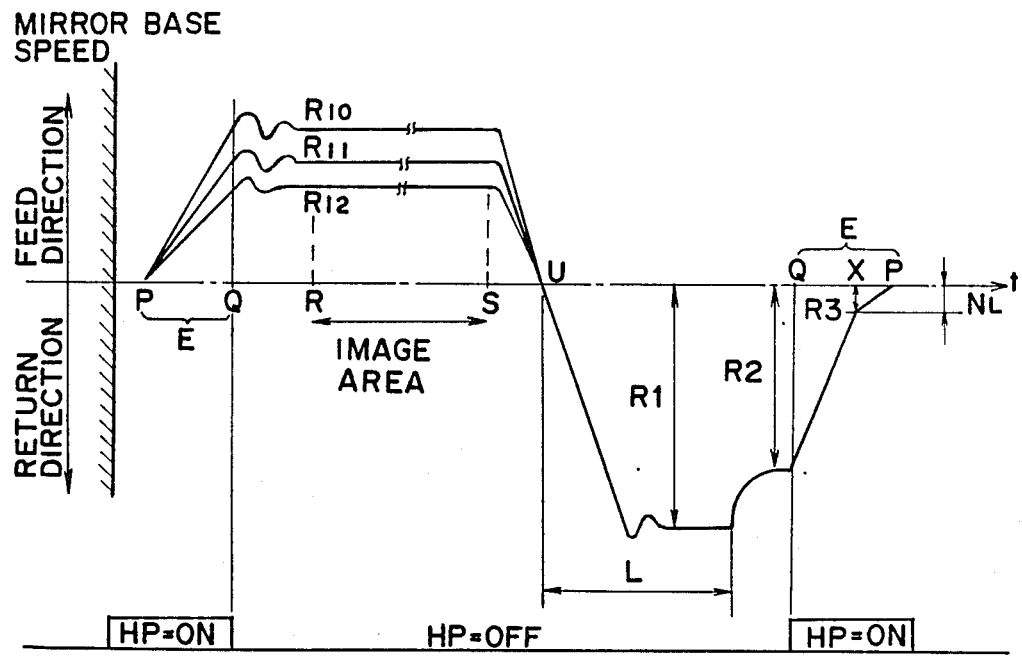
FIG. 5 is a graph showing an operation of the optical system of the copying machine according to the present invention, FIG. 6 are time charts showing operation of essential portions of the circuit arrangement shown in FIG. 3, FIG. 7 are graphs showing the relationships between the speed of the optical system and time.

FIG. 5 shows the change of speed of the DC motor 38 in a period of time beginning from the start of the movement of the mirror base MB1 in the feeding direction upon receipt of the start command and ending at the stop of the motor 38 at the home position of the mirror base 38.

The mirror base MB1 is located at the home position P in the initial state. When the power is fed, the optical system is correctly positioned at the home position P by the mirror initial command generated by the master CPU 50. When the motor 38 is driven under this state, the motor 38 is accelerated in the feed direction. The mirror base MB1 and the optical system is moved toward the image region passing the stop region represented by P and Q. The degree of the acceleration is proportional to the copy magnification value. When the mirror base MB1 reaches the leading edge R of the image region, the speed of the mirror base MB1 is stabilized and constant until the mirror base MB1 reaches the end S of the image region. The stabilized speed of the mirror base MB1 is controlled in such a manner that the slave CPU 51 reads the output pulses of the rotary encoder RE and outputs the motor drive signal so that the period of the pulse of the rotary encoder is kept constant. The respective characteristic curves R10, R11 and R12 represent the motor speed corresponding to the copy magnification values. These curves show that the motor speed changes corresponding to the set copy magnification value. After advancing in the feed direction, the passing of the mirror base MB1 past the terminal end S of the image area can be determined by the slave CPU 51 by counting the number of pulses of the rotary encoder RE. The slave CPU 51 causes the motor 38 to be braked by way of the countercurrent braking, whereby the speed of the mirror base MB1 in the feed direction drops abruptly and the period of the output pulses of the rotary encoder RE is extended in response to the speed of the mirror base MB1. When the length of the period of the pulse of the rotary encoder RE exceeds a predetermined value, the slave CPU 51 detects that the mirror base MB1 should cease advancing in the feed direction. The point U in FIG. 5 shows the point just before the output pulse of the rotary encoder RE becomes the maximum. Upon detection of the point U by the slave CPU 51, a motor drive signal is applied from the slave CPU 51 to the motor 38 for returning the mirror base MB1 at a speed R1 which is much faster than the speed of R10 to R12. The return speed of the mirror base MB1 reaches a constant speed after a while, and the slave CPU 51 causes the mirror base MB1 to return the distance L with a constant speed R1. After passage of the distance L, the return speed of mirror base MB1 is decelerated to speed R2 which is defined in such a manner that the mirror base MB1 can actually stop at the position P when the motor 38 is braked after detection of the vertical plate 34a by the home position sensor HPS. The speed R2 can be determined considering the various factors such as the length of the stop region, the maximum returning speed R1, and other factors which affect the inertia. When the mirror base MB1 reaches the point Q of the home position sensor HPS with the decelerated speed R2, the motor is subjected to the countercurrent braking. When the motor 38 reaches the speed R3, the power supply to the motor is cutoff to stop the mirror base MB1 at the stop position P.

The speed R3 mentioned above is determined so that when the power is cutoff after the countercurrent braking, the mirror base MB1 can stop at the position P. The speed R3 can be set without consideration of various factors affecting the inertia. The speed of the mirror base MB1 under this condition is defined as NL. In place of using the countercurrent braking, dynamic braking may be used at the position Q and then the power is cutoff. Further the countercurrent braking may be applied at the position Q and subsequently the dynamic braking may be applied at the position X. In the former case, the stop region E may be somewhat extended, but the stop position P can be cleared by suitably setting the deceleration speed R2.

Due to the speed control as mentioned above, during return of the mirror base MB1 the motor 38 is driven first with the maximum speed R1. When the mirror base MB1 reaches the position of the home position sensor, the motor 38 is driven with the deceleration speed R2 so that the mirror base MB1 can stably stop at the stop position P. Therefore, the time necessary for the mirror base MB1 to return to the home position can be decreased and the mirror base MB1 can stop correctly at the stop position P. Furthermore, since the change from the speed R1 to R2 and from R2 to the braked condition can be made without using a clutch, mechanical shock is decreased. Thus, a smooth return of the mirror base MB1 can be realized. In addition, since the mirror base MB1 enters the stop region after the speed has decelerated to the low speed R2 from the maximum speed R1, the length of the stop region can be decreased.

FIG. 6 shows the specific features of the control of returning of the mirror base MB1 in the stop region as mentioned above.

When the slave CPU 51 senses that the mirror base MB1 reaches the position Q by the signal of the home position sensor HPS, the driving mode of the motor 38 is switched to the counterclock rotation mode (described as c.c.w. in FIG. 6) or countercurrent brake mode from the clock rotation mode (described as c.w.). The motor abruptly decelerated consuming the inertia force of the mirror base MB1. Simultaneously, the period of the pulse train of the rotary encoder RE is extended to Tn from Tn−1. When the rotation speed of the motor 38 becomes the speed R3 just before the motor is stopped, the period of the rotary encoder RE becomes T. The period of T can be detected by comparison of the pulse train of the rotary encode RE with the threshold value $T_{th}$ stored in the ROM of the slave CPU 51. By comparing the period of the pulse train of the rotary encoder with the threshold $T_{th}$, the state of the motor in countercurrent braking can be determined just before the motor is stopped.

The following description explains the feature of an initial stop operation of the mirror base MB1 with reference to FIGS. 7A through 7C FIG. 7A shows the control sequence when the initial position Y of the vertical plate 34a is located at the position sufficiently away from the home position sensor HPS in the direction A. This state is referred to as the second initial stop mode. In this case, the motor 38 is accelerated to rotate at the constant speed R2 from the position Y, and at the position C, the motor speed becomes the constant speed R2. When the vertical plate 34a reaches the home position sensor HPS, the motor is decelerated. When the vertical plate 34a reaches the point X, that is when the motor speed becomes speed R3, (NL), the control mode is changed to the stop mode and the power to the motor is cutoff. Then the motor 38 stops at the point P. The speed R2 is so defined as mentioned with reference to FIG. 5 that when the control mode is changed to the braking mode at the position Q the mirror base MB1 can be stopped at the stop position P correctly. As mentioned above, the motion of the mirror base MB1 in the stop region E under the state shown in FIG. 7A is the same as the motion of the mirror base MB1 in the stop region E shown in FIG. 5. Thus, even if the initial position of the mirror base MB1 is to the right of point Q, the mirror base MB1 can be stopped correctly at the stop position P.

FIG. 7B shows the control sequence when the initial position Y of the mirror base MB1 is at a position to the left of position Q of the home position sensor HPS i.e., near the stop position P. This state is referred to as the first initial stop mode. In this case the mirror base MB1 is driven in the feed direction with a constant speed V, then after displacement of a suitable distance Li, the motor is subjected to the countercurrent braking. The motor subsequently goes to the return operation. When the motor speed becomes the return speed R2, and the vertical plate 34a reaches the point Q of the home position sensor HPS, the countercurrent braking is applied to the motor 38, thereby stopping the mirror base MB1 at the stop position P. In this case, the speed is controlled at R2 when the vertical plate 34a passes the position Q of the home position sensor HPS. The the mirror base MB1 can be stopped correctly at the stop position P.

FIG. 7C shows the control sequence when the initial position Y of the mirror base MB1 is at the position displaced slightly to the right of position Q of the home position sensor HPS, i.e., during the second initial stop mode. In this case, since the initial position Y is close to the position Q, even if the motor 38 is accelerated to the speed R2 in the return direction, the motor speed does not reach the speed R2 when the mirror base MB1 reaches the position Q. Accordingly, the countercurrent braking is performed at the point C and at the point D, the same control sequence as shown in FIG. 7B is performed. That is, the motor is driven in the feed direction with the speed V, when the mirror base MB1 is moved by the distance Li, then the countercurrent braking is performed to move the mirror base MB1 in the return direction. When the mirror base MB1 reaches the point Q, the motor 38 is driven so that the motor speed is R2 at the point Q. By this control, even if the mirror base MB1 is positioned slightly to the right of point Q, the mirror base MB1 can be stopped correctly at the stop position P.

The speed V and the distance Li can be determined so that the motor speed is at R2 when the mirror base MB1 reaches the point Q.

Figure 8:
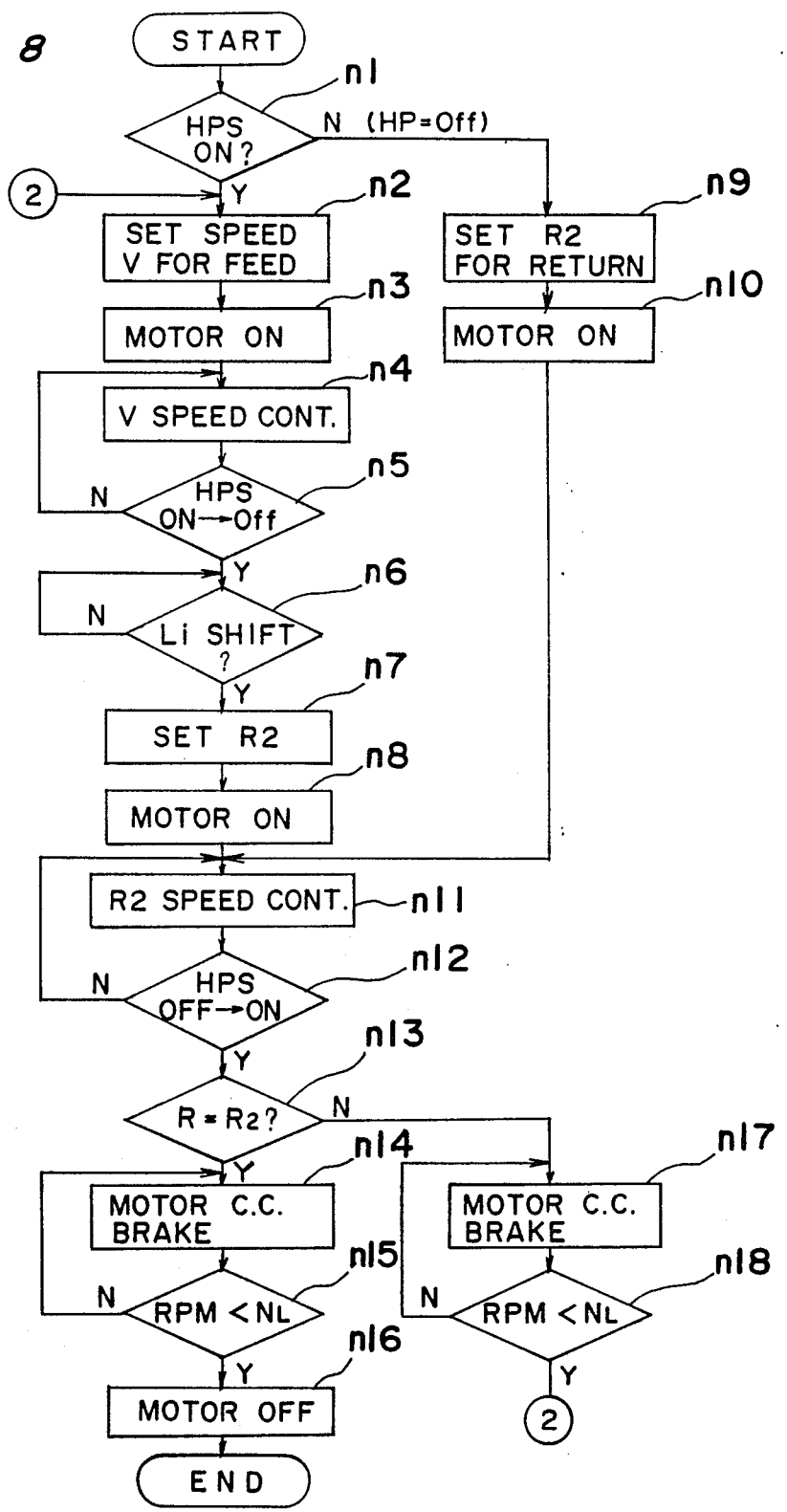
FIGS. 8 to 11 are respectively flow charts showing operation of the control device shown in FIG. 3, FIGS. 12 and 13 are schematic diagrams showing wave forms of essential portions of the control device shown in FIG. 3.

The control operation of the save CPU 51 is explained with reference to FIG. 8. In the step n 1, it is determined whether the initial position Y of the mirror base MB1 is in the stop position P side or opposite side with reference to the position Q of the home position sensor HPS. In case the initial position Y is not in the stop position side, the process advances to the step n 9. If the initial position Y is in the stop position side, the process advances to the step n 2. Thus, in case of the second initial stop mode as shown in FIG. 7A or 7C, the process advances to the step n 9. In case of the first initial stop mode, the process advances to the step n 2.

In the step n 2, the direction of the rotation of the motor 38 is set to advance the mirror base MB1 in the feed direction with the feed speed V. Subsequently, the motor 38 is turned on (the power is applied to the motor) in the step n 3 and then the process advances to the step n 4. Switching of the home position sensor HPS from on to off is detected in the steps n 4 and n 5. In the step n 6, the rotation direction of the motor 38 is changed to the return direction when the mirror base MB1 is moved the distance Li and the motor speed is set by R2 in the step n 7. In step n 8 the motor is turned on. In the step n 11, the return speed is controlled at R2. The change of the state of the home position sensor HPS is detected in the step n 12. The steps n 11 and n 12 are repeated until the the home position sensor HPS is turned on. With activation of the home position sensor HPS, step n 13 determines whether the speed of the motor is R2. If the speed is already R 2, the process advances to the step n 14 and the countercurrent braking is performed. In step n 15, it is detected if the motor speed is below R 3 (NL). When the motor speed is below R 3, the motor is turned off in the step n 16 and the process is ended.

In case of the second initial stop mode, the process advances to the step n 9, wherein the rotation direction of the motor 38 is set in the return direction and the speed is set to R 2. In the step n 10 the motor is turned on and the motor is controlled so that the motor speed is R 2 in the step n 11. The process then advances to the step n 12. The operation of the steps n 11 to n 16 is the same as mentioned above. If the speed is already R 2, the control sequence shown in FIG. 7A is performed. If the speed in not reached R2, the process advances to the step n 17 wherein the countercurrent braking is performed. In step n 18, it is determined whether the motor speed is lower than R 3 or NL. When the motor speed is lower than R 3 or NL, the process returns to the step n 2, whereby the control sequence shown in FIG. 7B is performed.

As mentioned above, whether the initial position of the mirror base MB1 of the copying machine is in the stop position side or opposite side relative to the home position sensor HPS, the mirror base MB1 can be correctly stopped at the desired position P. Accordingly, by performing the initial stop position control process as mentioned above, the mirror base can be correctly positioned at the desired position before the copy operation is started. Thus, incorrect copying can be prevented.

In the embodiment mentioned above, since the motor moves toward the home position sensor HPS at the low speed R 2 during return of the mirror base MB1 when the slave CPU 51 receives the mirror start command, the position of the mirror base can be correctly controlled in either the initialization or the normal copy operation.

Figure 9:
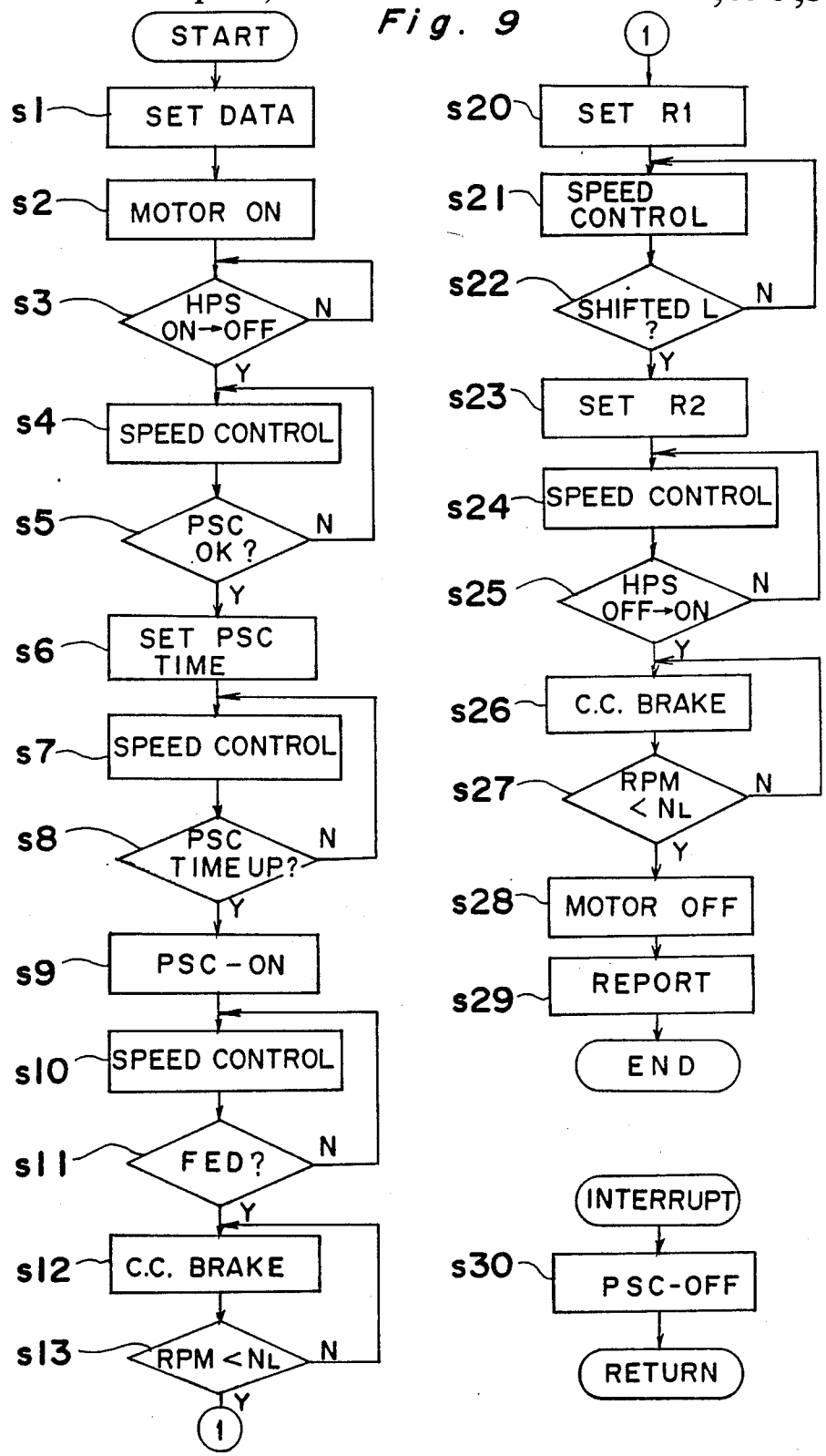

FIG. 9 shows a second embodiment of the method of controlling the initial position of the mirror base.

When the slave CPU 51 receives the mirror start command with the copy magnification data, PSC distance data and PSC time data from the master CPU 50, the feed speed, feed distance and PSC distance data are stored in the RAM in the step s 1. The feed speed and feed distance are calculated in the slave CPU 51 based on the data of the copy magnification data and paper size received from the master CPU 50. The PSC distance data represents the distance between the points Q and R in FIG. 5 and the PSC time data is the time between the period when the mirror base MB1 passes the point Q and the period when the paper start clutch PSC is turned on.

In the step s 2, the motor 38 is turned on and in step s 3, it is determined if the home position sensor HPS is on or off. When the end C of the vertical plate 34a of the mirror base MB1 passes the home position sensor HPS, the output of the HPS is turned on. The motor 38 is controlled in the step s 4 so that the mirror base MB1 is moved in the feed direction with the speed set in the step s 1. When the mirror base MB1 advances the PSC distance set in the step s 1, the process advances to the step s 5 through s 6. The distance of the displacement of the mirror base MB1 can be detected by counting the number of pulses of the rotary encoder RE. With the displacement of the PSC distance, a timer provided in the RAM is set by the PSC time data in the step s 6. The steps s 7 and s 8 are provided for waiting lapse of the PSC time. Upon lapse of the PSC time the paper start clutch PSC is turned on in the step s 9, whereby the copy paper is transported toward the photoreceptor drum 2 by the paper feed roller 40.

It is noted that the PSC distance data and PSC time data which are independent of the magnification value are given to the slave CPU 51 from the master CPU 50, so that these data can be corrected by the input keys connected with the master CPU 50. Upon turning on of the paper start clutch PSC in the step s 9, steps s 10 and s 11 detect whether the mirror base MB1 is moved to the image end position S. The motor 38 is controlled at the constant speed during that period. When the mirror base MB1 is moved to the end S of the image area, the countercurrent braking is performed in the step s 12, and after the motor speed falls to the speed R2 or NL, the process advances to the step s 20. NL is the rotation speed of the motor where the period of the pulse of the home position sensor HPS is at a maximum. The point U in FIG. 5 corresponds to the point where the speed of the mirror base MB1 is lower than that speed. When the mirror base MB1 passes the point U, the return speed R1 is set in the step s 20. The motor 38 is controlled at the maximum speed R1 in the steps s 21 and s 22 until the mirror base MB1 returns the distance L. When the mirror base MB1 returns the distance L, the motor 38 is set at the speed R2 in the step s 23. The motor 38 continues to run at this speed R2 until it is detected in the steps s 24 and s 25 that the output of the home position sensor HPS rises. When the output of the sensor HPS rises, the countercurrent braking is performed in the step s 26. After the motor speed falls below NL, the motor is turned off in the step s 28. The slave CPU 51 sends the report of the result of the operation including the return completion signal to the master CPU 50 and the operation is then completed.

Figure 4:
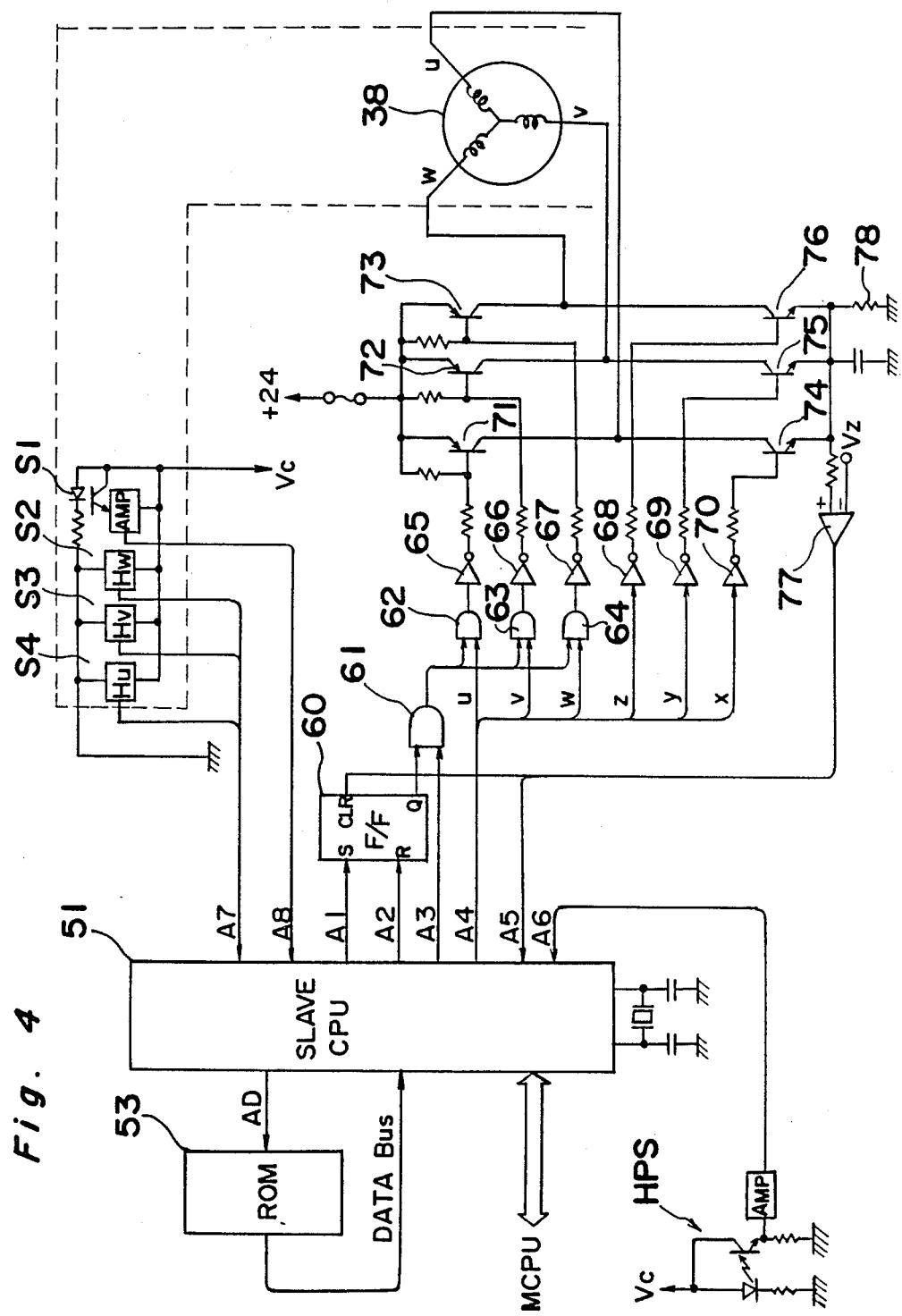
FIG. 4 is a detailed circuit diagram of the control device according to the present invention.

Referring to FIG. 4 which shows the peripheral circuit arrangement of the slave CPU 51, the motor circuit is arranged by the brushless DC motor 38 having three phases u, v and w, a sensor S 1 attached to the rotary encoder RE and sensors S 2, S 3 and S 4 of each phase u, v and w. The output signals of the sensors S 1 to S 4 and the home position sensor HPS are applied to the slave CPU 51 as the signals A6 to A8. Signals A1 and A2 of the slave CPU 51 are respectively fed to the set terminal S and reset terminal R of a flip flop 60. The signals A1 and A2 control the set time and reset time of the flip flop 60, whereby the pulse width of the current fed to the motor 38 can be controlled. The signal A3 is used to determine enabling or disabling the Q output of the flip flop 60 and is fed to an and gate 61. The signal A4 provides codes for determining the power supply timing of each phase u, v, and w and is fed to and gates 62, 63 and 64. Transistors 71 through 76 form a motor drive circuit and are turned on or off by the signals of the gates 65 through 70. In the period during which the transistors 71, 74, 72 and 76 are turned on, u and v phases are supplied. However, when the transistors 72, 75, 73 and 76 are turned on, the v and w phase are supplied. The transistors are switched by the codes defined by the signal A4. Thus, the power is supplied in the sequence uv vw wu so as to develop a rotational magnetic field.

A comparator 77 receives at its one input terminal an input voltage developed across a resistor 74 by the current fed from the transistors 71 through 76 and compares the input voltage with a standard voltage Vz. The result of the comparison is outputted as the signal A5 to the slave CPU 51. In this embodiment the "high" signal is outputted from the comparator 77 as representing the abnormal current in the case of the motor current exceeding a predetermined value. The abnormal current signal is fed to the flip flop 60 to compulsorily reset the flip flop 60, whereby the Q output is made low in order to decrease the motor current to 0. With the high signal of the comparator 77, the slave CPU 51 observes that the motor current is abnormally large.

Figure 10:
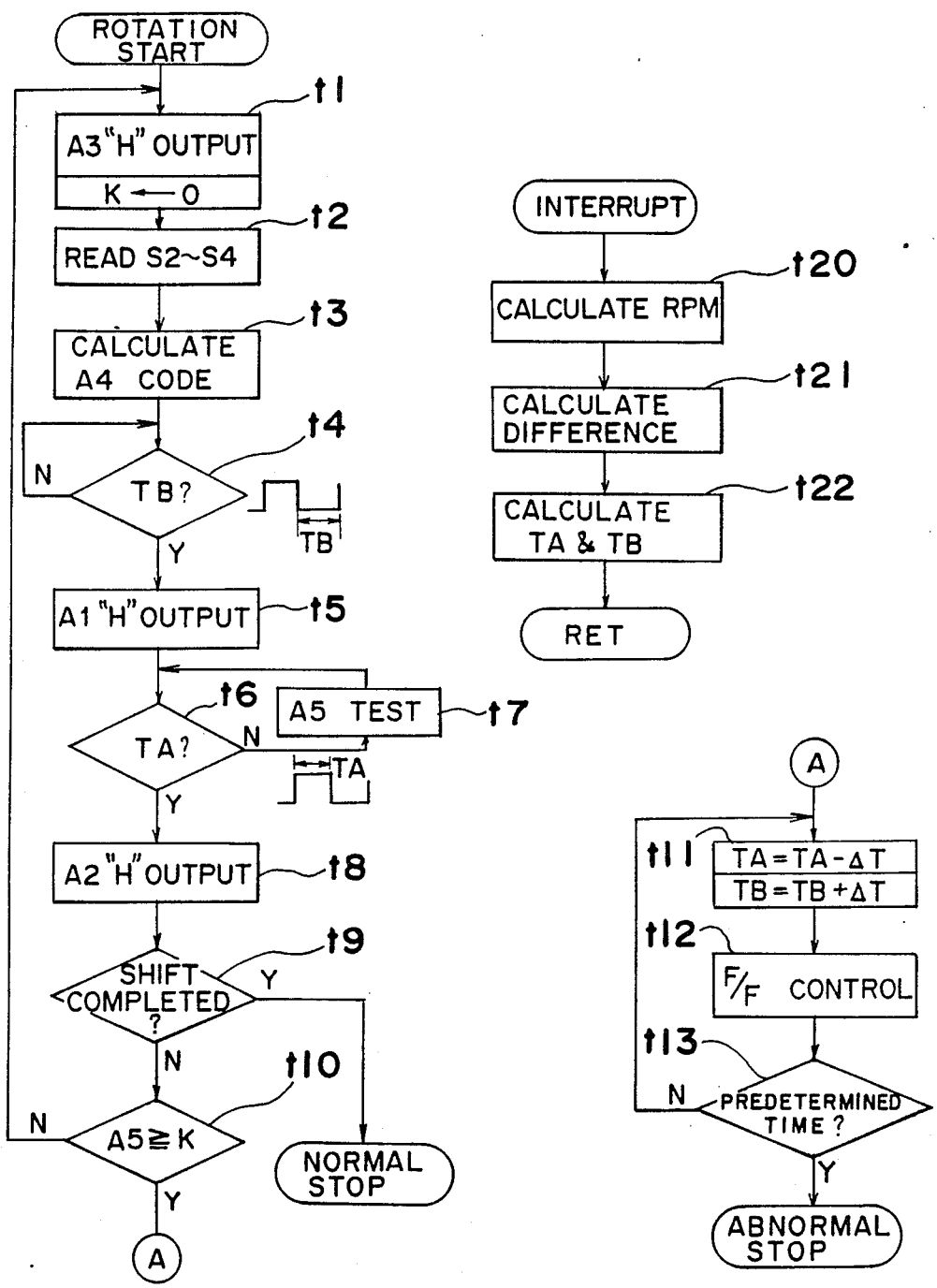

Referring to FIG. 10, the operation of the circuit arrangement of FIG. 4 is shown. When the motor 38 is started by the slave CPU 51 receiving the mirror start command from the master CPU 50, the slave CPU 51 outputs the high signal A3 in the step t 1. By the A3 signal of high level, the Q output of the flip flop 60 is activated and is applied to the motor drive circuit. In the step t 2, the angular position of the rotor of the motor 38 is detected by reading the output of the sensors S 2 to S 4. Then the combination of ON and OFF of the respective phases u, v and w is calculated in the step t 3 in the slave CPU 51 according to the result of the output of the sensors S 2 to S 4 and the signal A4 showing combination codes of ON and OFF is outputted. In the step t 4, the process waits for the time TB which is the OFF time duration of the motor 83 calculated by an interruption. When the time TB has lapsed, the signal A1 is set to "H" in the step t 5. Subsequently, the process waits for the time TA during which the motor 38 is turned ON, which is calculated in the interruption process which will be mentioned later. During this period, step t 7 determines whether or not the signal A5 is "H". Upon lapse of the time TA, the signal A 2 is made "H" in the step t 8. The respective transistors 71 to 76 are turned on or off corresponding to the content of the signal A4 and the ON or OFF states of the transistors are kept for the period during which the signal A 1 is "H", i.e., the flip flop 60 is set. To the contrary, when the signal A2 is set "H" in the step t 8, the flip flop 50 is reset, whereby all the transistors are turned off while the flip flop 60 is reset. If the signal A 5 is "H" i.e., the motor current is greater than the standard value, an internal counter is increased.

In the step t 9, it is determined whether or not the mirror base MB1 is moved a predetermined distance. This determination is made by judging whether the mirror base MB1 is displaced a predetermined distance up to the stop position after the signal A6 of the home position sensor HPS is received. In the step t 10, it is determined that the number of times of which the signal A5 is made "H" is greater than a predetermined number K. If the number of times is smaller than K, the steps t 2 to t 9 are repeated whereby the flip flop 60 is reversed, causing the motor 38 to be rotated.

In the control process mentioned above, if the signal A 8 from the sensors S 1 of the encoder RE is applied to the slave CPU 51, an interruption is enabled so that the steps following to t 20 are executed. In the step t 20, the number of rotation of the motor 38 is calculated by the number of the pulses of the signal A 8. Subsequently, in the step t 21, a difference between the actual number of rotation of the motor and the desired number of rotation of the motor is calculated. The desired number of rotation of the motor which corresponds to the desired speed of the optical system is preliminarily stored in the ROM 53. The the process advances to the step t 22 wherein the ON duration T A and OFF duration T B of the motor current are calculated so as to control the motor speed at the desired speed. The duration T A and T B is used in the step t 4 and t 6.

In case the number of times of which the signal A 5 becomes "H" exceeds the predetermined value K, the steps t 11 to t 13 are executed and emergency stop occurs. In the step t 11, T A−ΔT and T B+Δt are calculated so that the ON and OFF time duration TA of the transistors just before the step t 12 is executed is shortened by ΔT thereby causing the motor speed to be decelerated. The flip flop 60 is reset and set. The steps t 11 and t 12 are repeated for a predetermined time and the motor can be stopped. Since the master CPU 50 receives the abnormal status signal, the master CPU 50 performs a suitable warning such as an emergency display to the operator. By the operation mentioned above, the motor can be gradually decelerated and stopped.

If the number of times the signal A 5 is "H" is less than the predetermined value K the emergency stop is not made as mentioned above. Therefore, when the signal A 5 is made "H" by noise, this situation can be neglected. That is, the emergency stop or abnormal stop is not made by the noise or instant excessive current. Also in the preferred embodiment, since the time for performing the steps t 2 to t 9 is very short, the step t 10 serves to detect that the time of generation of the abnormal current is longer than a predetermined time. Accordingly, the abnormal stop for both of the abnormal currents occurring over a long time or occurring intermittently can be made.

Figure 11:
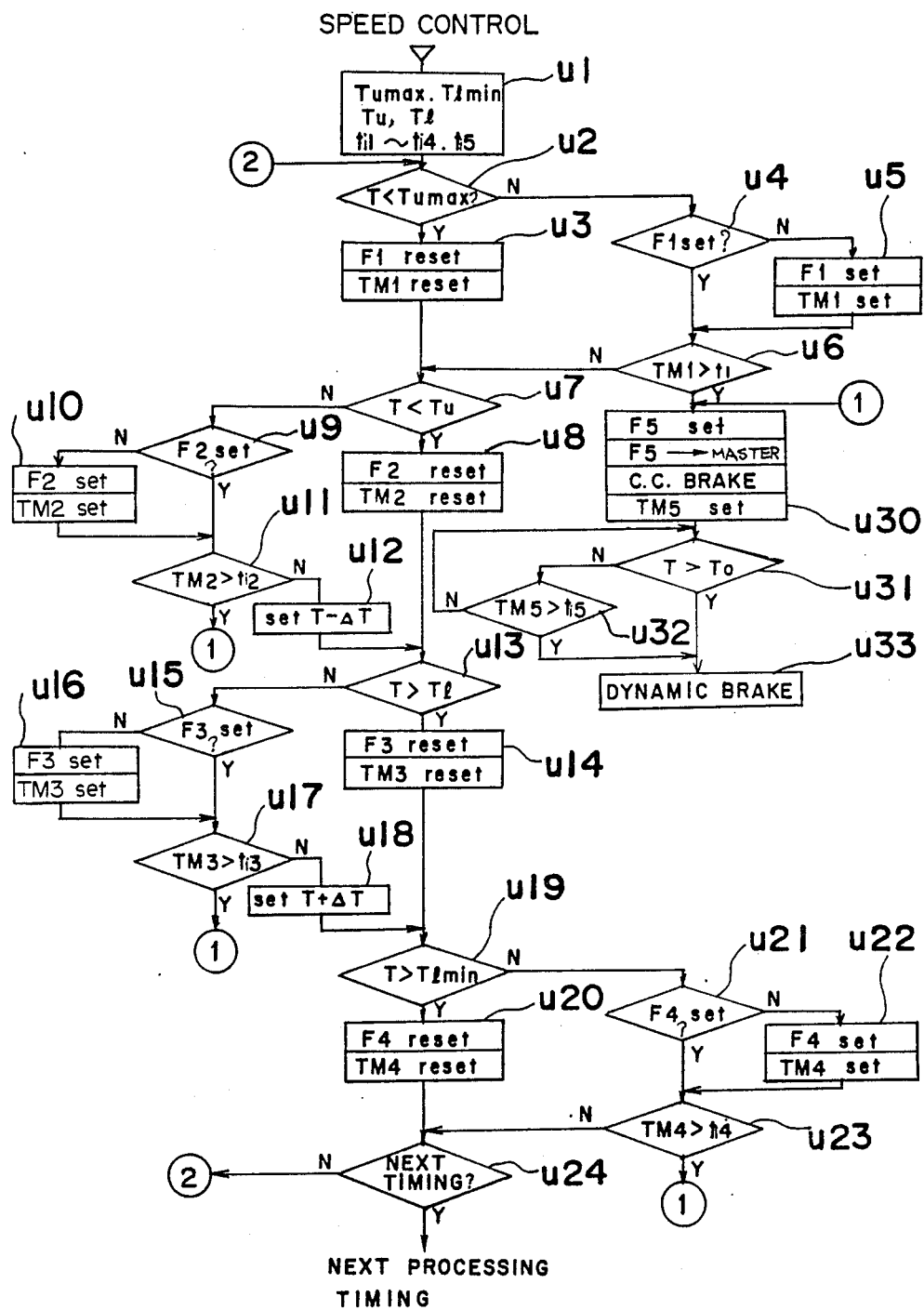
Figure 12:
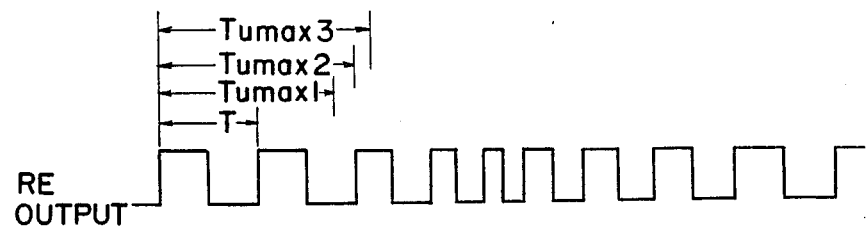
Figure 13:
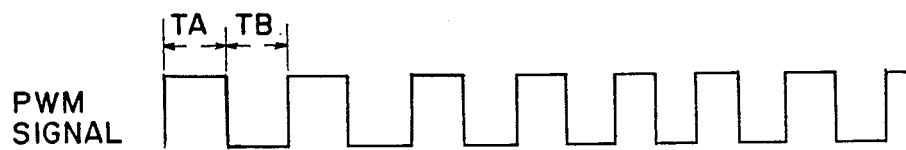

FIG. 11 shows the process of stopping the motor while the motor is driven in the feed direction or return direction in the copying machine as mentioned with reference to FIGS. 1 to 10.

Figure 14:
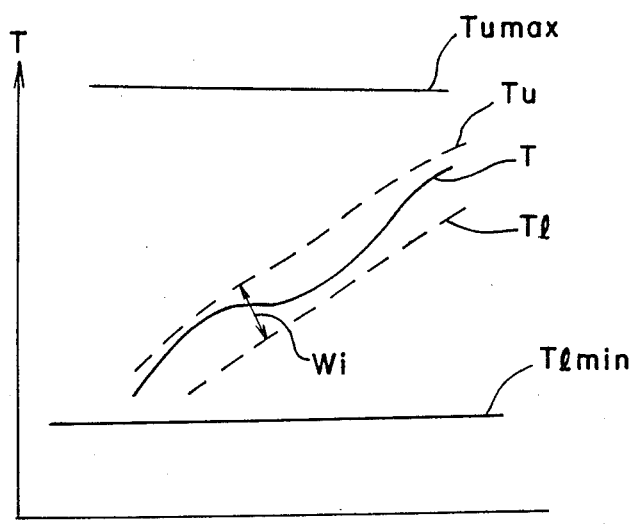
FIG. 14 is a graph showing operation of the device according to the present invention.

In this embodiment, an upper limit Tumax and a lower limit Tmin of the period of the pulses of the rotary encoder RE are provided these limits prevent an either overshoot or undershoot of the speed control due to noise or the like as p1 or p2 shown in FIG. 5. Also, the desired upper limit value Tu and desired lower limit value Tl are set so as to stop the motor regarding as the abnormal current occurs when the period of the pulse of the encoder is out of the range Wi shown in FIG. 14 a long time.

In the step u 1, standard values Tumax and Tlmin for stopping the motor in a short time when the motor speed is changed abruptly, a desired upper value Tu, a desired lower value Tl for stopping the motor when the pulse period exceeds continuously the control range Wi, predetermined times ti1 to ti4 and ti5 are all stored in the RAM. The time ti1 is the period of the pulse of the rotary encoder exceeding the upper value of Tumax for determining the abnormal speed. The time ti2 is the period of the pulse of the rotary encoder exceeding the desired upper value Tu for determining the abnormal speed. The time ti3 is the period of the pulse of the rotary encoder less than the desired lower value Ti. The time ti4 is the period of the pulse of the rotary encoder less than the desired lower limit value Tlmin. Times ti1 to ti4 are respectively determined so as to stabilize the control system. Times ti1 and ti4 are sufficiently shorter than ti2 and ti3. In the step u 2, the pulse period T and the upper value Tumax are compared, and if the former is shorter than the latter, the process advances to the step u 3 to reset a flag F1 and timer TM1. The flag F1 is used for warning. The timer TM1 counts the time of the pulse period exceeding the upper value Tumax. If the pulse period T exceeds Tumax, the process advances to the step u 4 to determine the state of the flag F1. With the flat Fi reset, the flag F1 is set in the step u 5 and the timer TMI is started. Subsequently, the content of the timer TMI and the time ti1 are compared in the step u 6 and if the former is larger than the latter, the process advances to the step u 30 to execute the abnormal processing. With the content of the timer TMI less than the time ti1, the process advances to the steps u 7 to u 12 so as to execute the comparison processing using the desired upper limit value Tu and the time ti1 as the standard value. In case the pulse period T is less than the desired upper limit Tu in the step u 7, the warning flag F1 is reset and the timer TM2 is reset in the step U 8. The timer TM2 counts the time of the pulse period T exceeding the desired upper limit value Tu. If the pulse period T exceeds the desired upper limit value Tu, the processes performed similar to the steps u 4 to u 6 are executed in the steps u 9 to u 11. If it is determined in the step u 11 that the content of the timer TM2 is less than the time ti2 the process advances to the step n 12 to control the motor current to decrease the period T by a small value ΔT, so as to accelerate the motor 38 slightly. If it is determined in the step u 11 that the content of the timer TM2 is more than the time ti2, the process advances to the step u 30 for abnormal processing.

In the steps u 13 to u 18, the process for comparing the pulse period and the desired lower limit value Tl and the time ti2 as the standard values is shown. F3 is a warning flag. The timer TM3 counts the time of the pulse period less than the desired lower limit value Tl. The operation is almost the same as that of the steps u 7 to u 12. However, in the step u 18, the pulse period is extended by ΔT so as to decelerate the motor speed.

In the steps u 19 to u 23, the process for comparing the pulse period and the desired lower limit Tlmin and the time ti4 is shown. F4 is a warning flag. The timer TM4 counts the time of the pulse period less than the lower limit value Tlmin. The operation is almost the same as that of the steps u 2 to u 6. If the content of the timer TM4 exceeds the time ti4, the abnormal processing after u 30 is executed.

The above operation is executed during every speed control process timing. When the speed control process as mentioned above is completed, the process advances to the subsequent timing from the step u 24, whereby the slave CPU 51 performs other processing.

Repeating the above processing, if the content of the timers in the steps u 6, u 11, u 12 and u 23 is out of the predetermined time, the process advances to the step u 30 for the abnormal processing. In the step u 30 of the abnormal processing, a flag F5 for representing the abnormal state of the optical system is set and the master CPU 50 is informed of the abnormal state. The motor 38 is subjected to the countercurrent braking and the timer TM5 is set about. The timer TM5 counts the time T longer than a period T0 during which dynamic braking is performed. The time T and the period T0 are compared in the step u 31. If the period T0 is longer than the time T, the process advances to the step u 23 to perform the dynamic braking. In case the content of the timer TM5 exceeds a predetermined time Ts and the period T does not exceed the period T0, the process advances to the step u 33 directly and the motor 38 is stopped using the dynamic braking.

By the above operation, the motor 38 can be instantly cut off from the power supply when locking condition occurs during feeding or returning of the optical system preventing the undesired effect of the noise. According to the embodiment, if the motor is driven when the pulse period of the rotary encoder (the motor speed) is slightly out of the normal control range for a continuous predetermined time, the motor can be cut off form the power supply, causing the life of the motor to extend.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling return speed of an optical system in a copying machine, said optical system being moved by a motor in a feed direction with a predetermined feed speed and a return direction for returning to a predetermined home position, said method comprising
   returning the optical system with a first speed higher than the feed speed,
   decelerating the return speed from the first speed to a second speed which is lower than the first speed to permit countercurrent braking to the motor without control disturbance,
   performing a countercurrent braking of the motor after the return speed is decelerated to or lower than the second speed, and
   controlling the speed of the motor after the countercurrent braking process is performed such that the optical system can be stopped at the home position.

2. The method according to claim 1, and further including controlling the motor speed by detecting periods of pulse generated from an encoder attached to the motor for generating pulses representing the speed of the motor.

3. A method of controlling return speed of an optical system in a copying machine, said copying machine having a motor capable of driving the optical system in a feed direction away from a stop position and in a return direction toward the stop position, said copying machine having a home position sensor which the optical system passes as it moves away from and toward the stop position, said method comprising the steps of:

determining the initial position of the optical system;
driving the optical system in one of two modes,
- the first mode comprising driving the optical system in the feed direction for a predetermined distance at a predetermined feed speed and then initially driving the optical system in the return direction at a first return speed, said first mode being activated when the optical system is initially located at the stop position,
- the second mode comprising driving the optical system in the return direction at a first return speed, said second mode being activated when the optical system is initially located at a second mode position past the home position sensor in the feed direction and said second mode position being distant from the stop position; and reducing the first return speed of the optical system to a second return speed after the optical system has passed the home position sensor as the optical system moves in the return direction, said reducing of the first return speed being accomplished by braking of the motor and said reducing permitting the optical system to accurately stop at the home position.

4. The method according to claim 3 comprising the steps of:
- driving the optical system at the first return speed in the second mode such that this first return speed is less than a normal, predetermined value; and
- controlling the motor to accurately reduce the first return speed to the second return speed after the optical system has passed the home position sensor.

5. A method of controlling return speed of an optical system in a copying machine, said optical system being moved by a motor in a feed direction with a predetermined feed speed and a return direction for returning to a predetermined home position, said method comprising the steps of:
- returning the optical system with a first speed higher than the feed speed,
- decelerating the return speed from the first speed to a second speed which is lower than the first speed to permit countercurrent braking to the motor without control disturbance,
- performing a countercurrent braking of the motor after the return speed is decelerated to or lower than the second speed,
- controlling the speed of the motor after the countercurrent braking such that the optical system can be stopped at the home position,
- detecting the motor current,
- comparing the detected motor current with a predetermined current value,
- detecting abnormal conditions of the motor by detecting when the motor current exceeds the predetermined current value, and
- stopping the motor by decelerating the motor speed gradually when the abnormal condition is detected.

6. The method according to claim 5, and further comprising the steps of driving said motor by pulses, performing the detecting of motor current by detecting pulse periods and performing the detecting of abnormal conditions of the motor by judging when the pulse periods exceed a predetermined value.

* * * * *

UNITED STATES PATENT AND TRADEMARK OFFICE
CERTIFICATE OF CORRECTION

PATENT NO.   : 4,693,595

DATED        : September 15, 1987

INVENTOR(S) : Norihide KUNIKAWA et al.

It is certified that error appears in the above-identified patent and that said Letters Patent is hereby corrected as shown below:

On the first page of the patent, please change item (73) "Assignee: Sharp Kabushiki, Osaka, Japan" to --Assignees: Sharp Kabushiki Kaisha, Osaka, Japan and Kokusan Denki Co., LTD., Shizuoka, Japan--; and Please insert --Attorney, Agent, or Firm - Birch, Stewart, Kolasch and Birch--

Signed and Sealed this

Twenty-second Day of March, 1988

*Attest:*

DONALD J. QUIGG

*Attesting Officer*     *Commissioner of Patents and Trademarks*